July 14, 1959 J. H. PROBUS 2,895,061

PIEZOELECTRIC SANDWICH TRANSDUCER

Filed Jan. 20, 1958 2 Sheets-Sheet 1

JAMES H. PROBUS
INVENTOR.

BY

ATTORNEYS

PIEZOELECTRIC SANDWICH TRANSDUCER

Filed Jan. 20, 1958 2 Sheets-Sheet 2

JAMES H. PROBUS
INVENTOR.

BY

[signatures]
ATTORNEYS

United States Patent Office 2,895,061

Patented July 14, 1959

2,895,061

PIEZOELECTRIC SANDWICH TRANSDUCER

James H. Probus, Falls Church, Va., assignor, by mesne assignments, to the United States of America as represented by the Secretary of the Navy Application January 20, 1958, Serial No. 710,168

9 Claims. (Cl. 310—9.7)

This invention relates broadly to electromechanical systems and more particularly to an improved method of constructing piezoelectric transducers and to an improved construction of piezoelectric transducers.

It is well known in the prior art that piezoelectric crystals may be used for frequency control and as transducers for converting electrical energy to mechanical energy and vice versa. However, prior art piezoelectric transducers are considered unsatisfactory due to their low overall efficiency and their low electromechanical coupling coefficient, their fixed Q, their relatively large weight and volume, the inability to machine piezoelectric crystals to required tolerances, their temperature dependency, and the inability to satisfactorily support the piezoelectric crystal by means of supporting elements.

In electroacoustic systems piezoelectric transducers have the disadvantages specified hereinabove and additionally are subject to the disadvantage that they are not amenable to shading as is done with magnetostrictive transducers for obtaining highly directional arrays. Due to the serious disadvantages referred to hereinabove inherent in the prior art piezoelectric crystals transducers, such transducers were eventually replaced in part by transducers of the magnetostrictive type described by Leon W. Camp in U. S. Patent Numbers 2,530,224 and 2,550,771 to which reference is made. With regard to magnetostrictive transducers it is well known that such transducers must be formed of thin sheets of nickel and that the size and volume of the transducer element increases and decreases respectively for lower and higher resonant frequencies. Although the magnetostrictive type transducer has to date proved superior to and more satisfactory than prior art piezoelectric transducers, construction of such transducers requires time consuming, complicated, and expensive manufacturing procedures and also requires the use of nickel, an expensive metal considered strategic for military purposes since only a limited supply is available within the United States. Magnetostrictive transducers have the additional disadvantage that arrays comprised of a plurality of such transducers having relatively low resonant frequencies of for example ten kc. or less, have dimensions and a mass that seriously limits their use and in some cases prohibits their use.

These and other difficulties are avoided by virtue of the novel arrangements according to the invention, the main feature of which consists in bonding one or more thin piezoelectric discs between two inert rods in a sandwich construction having for its preferred embodiment a physical configuration designed in substantial accordance with the construction specific to laminated magnetostrictive transducers as taught by Leon W. Camp in U. S. Patent Numbers 2,530,224 and 2,550,771, to which reference has already been made, with the exception that solid, forward and rearward quarter-wave sections are interconnected by a solid constricted portion having a point of maximum compression occurring in the restricted portion a predetermined distance from the rearward change in cross section, providing one or more thin piezoelectric discs such as for example, barium titanate, at a predetermined distance from the displacement node or point of maximum compression whereby they form a part of the constricted section and bonding the piezoelectric discs to each other and/or to portions of the constricted section in a manner hereinafter described.

It is therefore, an object of this invention to provide a piezoelectric transducer having the best features of the magnetostrictive type transducer and piezoelectric type transducer.

It is another object of the invention to provide a piezoelectric transducer whose dimensions and mass are both less than the dimensions and mass of a magnetostrictive transducer operating at the same frequency.

Another object of the invention is the provision of a transducer substantially equivalent in operation to a magnetostrictive transducer and that may be mass produced from commonly available and inexpensive materials.

Still another object of the invention is the provision of a piezoelectric sandwich transducer substantially equivalent in operation to a magnetostrictive transducer having a plurality of driving coils for different operating conditions.

A still further object of the invention is the provision in a piezoelectric sandwich transducer of new and improved means for aligning and bonding one or more piezoelectric discs therein.

Other and further objects of the invention reside in a new principle of piezoelectric sandwich transducer construction as set forth more fully in the specification hereinafter following by reference to the accompanying drawings in which.

Figure 5:
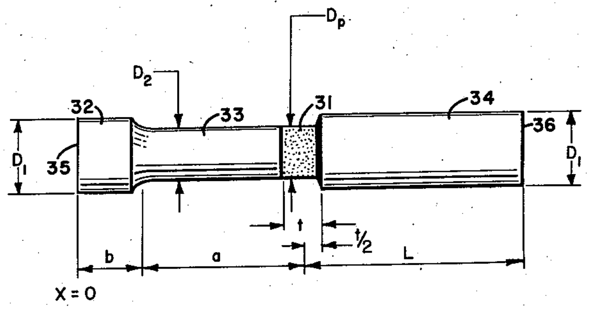

Figure 5 illustrates a piezoelectric sandwich type structure which is unsymmetrical with respect to its transverse axis and symmetrical with respect to its longitudinal axis, where the center of the piezoelectric disc and the displacement node are coincident and located at the junction of the constricted section of the solid block. For purposes of illustration the piezoelectric disc or discs are shown greatly enlarged in all of the figures.

Figures 3, 6:
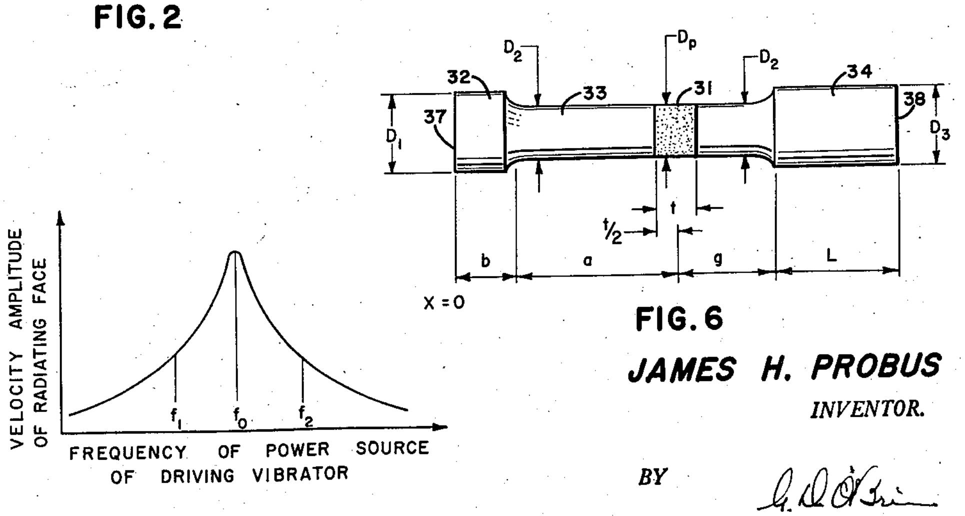
Figure 3 is a curve diagram showing the velocity amplitude of a resonant vibrating system as a function of frequency.

Figure 6 illustrates a piezoelectric sandwich type structure which is unsymmetrical with respect to its transverse axis and symmetrical with respect to its longitudinal axis where the center of the piezoelectric disc and the displacement node are coincident and located in the constricted section in accordance with the invention.

Figure 7:
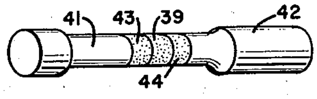

Figure 7 is a perspective view of a shaded piezoelectric sandwich transducer containing two piezoelectric discs at different positions in the constricted section and separated by an intermediate material in accordance with the invention.

Figure 8:
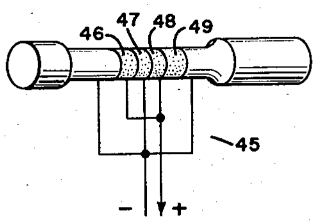

Figure 8 is a perspective view of an alternate form of a shaded piezoelectric sandwich transducer containing four piezoelectric discs in the constricted section such that their electrode surfaces may be connected electrically to obtain a desired amplitude shading.

Figure 9:
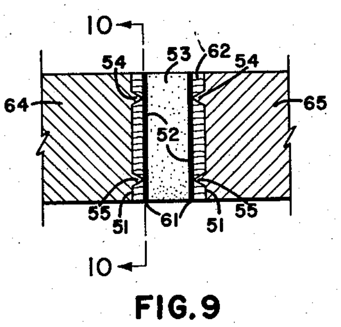

Figure 9 is an enlarged sectional view showing the connection of a piezoelectric disc in the constricted section in accordance with the invention.

Figure 10:
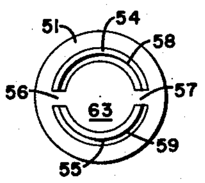

Figure 10 is a transverse sectional view taken on line 10—10 of Figure 9.

Figure 11:
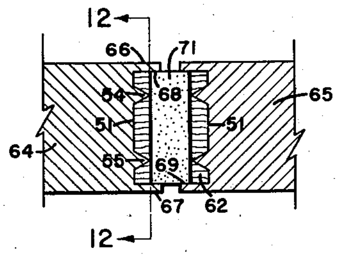

Figure 11 is an enlarged sectional view of a modification of the representation shown in Figure 9 to facilitate centering of the piezoelectric disc.

Figure 12:
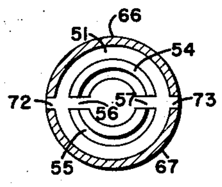

Figure 12 is a transverse sectional view taken on line 12—12 of Figure 11.

Figure 13:
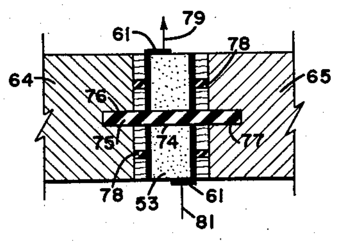

Figure 13 is an enlarged sectional view of an alternative embodiment for centering and bonding an electrically isolated piezoelectric disc in the constricted section.

Figure 1:
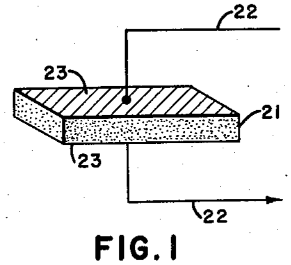
Figure 1 shows a simple piezoelectric bar.

Referring to the drawings in detail, Figure 1 illustrates a piezoelectric slab or bar 21 with electrical leads 22 connected to electrically conducting surfaces 23. An alternating electrical field applied across the piezoelectric material 21 by means of the electroded surfaces 23 will cause mechanical deformations both in the direction of the electric field and in the directions normal to this field, and the bar 21 will vibrate in these directions with the same frequency as the alternating electric field.

For the simplest type of motion of a piezoelectric bar as shown in Figure 1, in which the bar 21 vibrates at its fundamental frequency of longitudinal resonance, it is necessary to consider only the vibration that occurs in the direction of the electrical field; the center remains fixed and each half moves outward from the center. The distance which a point on the bar 21 will move from its rest position increases with the distance of this point from the center. When the driving frequency and the length of the bar have the relation:

$$f=\frac{c}{2L}$$

where $f$ is the frequency, L is the length of the rod, and $c$ is the velocity of sound in the rod, there is a resonance phenomenon and the motion of the rod is much greater than at other frequencies. Under these circumstances, the bar is called a half wave vibrator because the length of the bar corresponds to one half the length of the sound wave in the material at this frequency.

Figure 2:
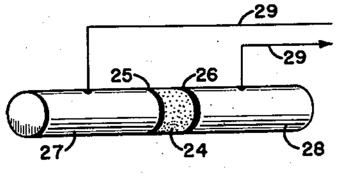
Figure 2 illustrates a simple sandwich type structure consisting of a piezoelectric disc bonded between two rods of a different and inert material.

The vibrating system as shown in Figure 1 for piezoelectric materials, is far from ideal. Thus a very important quantity, the coefficient of electromechanical coupling, is often lower when the principal direction of vibration is normal to the direction of the applied electric field than when it is in the same direction. Furthermore the system does not make the most economical use of piezoelectric materials since the entire bar 21 consists of a piezoelectric material which, as will become evident hereinafter, is unnecessary when a half wave vibrator is used. Still another disadvantage of the system shown in Figure 1 is that the elastic constants of piezoelectric materials are so temperature dependent that undesirable changes in the resonant frequency of the bar will generally result from comparatively small changes in its temperature. Piezoelectric materials are also difficult to handle and to machine to close dimensional tolerances. These objectional characteristics may be largely overcome by placing a thin slab or disc of piezoelectric material between bars or rods of certain inert materials such that the piezoelectric material and the other materials are rigidly joined together at their boundaries to form a sandwich structure as shown in Figure 2. In Figure 2 an electroded piezoelectric disc 24 is bonded at its boundaries 25—26 to two rods 27—28 comprised of an inert and conductive material such as for example brass. The rods 27—28 are good electrical conductors and are formed to make electrical contact with the electroded surfaces of the piezoelectric disc in a manner to be more fully described hereinafter. Electrical leads 29 from a driving generator (not shown) may be connected to the rods 27—28 by spring contact, solder, or by being pinched in drilled holes. While the rods 27—28 are shown and referred to herein as good electrical conductors it is not essential that in every case they be good conductors since electrical connection may be made to the electrodes of the piezoelectric disc by other means as will be indicated. It is essential, however, that in every case the rods have sound transmitting properties such that the velocity of sound in the rods is matched as closely as possible with the velocity of sound in the piezoelectric disc or discs.

When the rods 27—28 are of the same material and the piezoelectric disc 24 is located at the center of the sandwich and the vibrator is in motion, the material in a transverse plane through the piezoelectric disc 24 equidistant from its ends, remains fixed. The sandwich structure as shown in Figure 2 is symmetrical with respect to this plane and the two ends of the structure have the same amplitude of motion. If this system is to be used to send out an acoustic signal in one direction, one end is placed in operative contact with the medium such as for example water in underwater signalling, and the other end is isolated from the medium by an intervening material which will not permit the sound to pass through, sound consisting simply of the vibratory motion imparted to the medium by the vibrating ends of the bars.

A very important matter of concern in the construction of these vibrators used to produce sound in a medium is the efficiency of conversion of the electrical driving energy into the transmitted acoustical energy. For any vibrator, this efficiency is highest at the resonant frequency. According to the previously given relationship $$f=\frac{c}{2L}$$

for a simple bar, one can choose a proper length for a desired frequency of operation, knowing the velocity of sound in the material used. For the vibrator of Figure 2 the relationship between frequency and the dimensions of the structure is somewhat more complicated, but the resonant frequency is still determined by the physical dimensions and the physical properties of the material used. There are a number of different piezoelectric materials and other inert materials that are suitable for the rods of the sandwich type structure but the same principles of design are applicable to all of them.

Since these vibrators must be used in the vicinity of resonance for efficient energy conversion, another very important point is the rate at which the magnitude of maximum velocity of vibration drops off from its peak at the resonant frequency as the driving frequency varies from the resonant frequency. To make this point clear consider the curve of Figure 3 which shows how the maximum velocity of the radiating face changes with frequency when the vibrator is being driven by a constant force. The power radiated into the medium is directly proportional to the square of this velocity. If the points $f_1$ and $f_2$ represent frequencies at which the vibrator is delivering only one half the power delivered at the maximum, $f_0$, then the quantity:

$$\frac{f_0}{f_2-f_1}=Q$$

defines a quantity generally known as the mechanical "Q" of the vibrator. If this quantity is large, the velocity falls off rapidly away from the resonance frequency, and if small, slowly. The "Q" then, of a transducer is a factor of merit. For most applications, it must be small. The mechanical Q of a piezoelectric sandwich type structure may be readily controlled by structural design and is determined by the expression:

$$Q=\frac{\overline{M}\omega_0}{R}$$

where $\overline{M}$ is a quantity determined by the dimensions and materials of the structure, and is called the equivalent mass, $\omega_0=2\pi f_0$, and R is the resistance to motion, internal and external, which absorbs energy from the system. External resistance is offered by the medium and gives rise to useful energy absorption. The internal resistance leads to a wasteful absorption of energy within the structure and the bonding material and can be held to a minimum by a proper design as described hereinafter.

The mechanical "Q" of a transducer is, in a sense, a measure of its loading, and, like any other electromechanical device, there is a best load for maximum efficiency. This best load is a function of the coefficient of electromechanical coupling of the piezoelectric material used. If it is desired to operate a transducer at a low "Q," any improvement in the coefficient of electromechanical coupling increases the efficiency of energy conversion and is an improvement of major importance.

Figure 4:
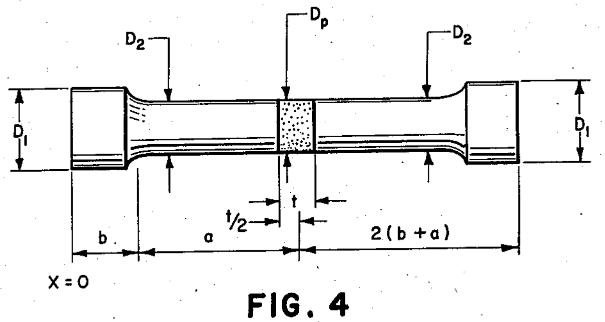
Figure 4 is a cross sectional view of a sandwich type structure symmetrical with respect to both its transverse and longitudinal axes.

Three types of useful sandwich type structures are shown in Figures 4, 5 and 6. For all of these constructions, the dimension $b$ as shown in the figures is limited by a stiffness requirement for the radiating face, and it may well be the same for all of them. The equations which must be satisfied to obtain a given resonant frequency for the most general structure design, that of Figure 6, are as follows:

$$M=\frac{\left(\left[\cot k_p\left(b+a-\frac{t}{2}\right)-\cot k_p(b+a)\right]\left[\cot k\left(b+a-\frac{t}{2}\right)-\cot kb\right]+\frac{S_p\rho_pc_p}{S_2\rho_2c_2}\left[1+\cot k_p(b+a)\cot k_p\left(b+a-\frac{t}{2}\right)\right]\left[1+\cot kb\cot k\left(b+a-\frac{t}{2}\right)\right]\right)}{\left(\left[\cot k_p\left(b+a-\frac{t}{2}\right)-\cot k_p(b+a)\right]\left[\cot k\left(b+a-\frac{t}{2}\right)+\tan kb\right]+\frac{S_p\rho_pc_p}{S_2\rho_2c_2}\left[1+\cot k_p(b+a)\cot k_p\left(b+a-\frac{t}{2}\right)\right]\left[1-\tan kb\cot k\left(b+a-\frac{t}{2}\right)\right]\right)}$$

$$N=\frac{\left(\left[\cot k_p\left(b+a+\frac{t}{2}\right)-\cot k_p(b+a)\right]\left[\cot k(b+a+q)-\cot k\left(b+a+\frac{t}{2}\right)\right]-\frac{S_p\rho_pc_p}{S_2\rho_2c_2}\left[1+\cot k_p(b+a)\cot k_p\left(b+a+\frac{t}{2}\right)\right]\left[1+\cot k\left(b+a+\frac{t}{2}\right)\cot k(b+a+q)\right]\right)\cot kL}{\left(\left[\cot k_p\left(b+a+\frac{t}{2}\right)-\cot k_p(b+a)\right]\left[\cot k\left(b+a+\frac{t}{2}\right)\cot k(b+a+q)+1\right]+\frac{S_p\rho_pc_p}{S_2\rho_2c_2}\left[1+\cot k_p(b+a)\cot k_p\left(b+a+\frac{t}{2}\right)\right]\left[\cot k(b+a+q)-\cot k\left(b+a+\frac{t}{2}\right)\right]\right)}$$

where:

$$M=\frac{S_1}{S_2}$$

Where $S_1$ and $S_2$ are the cross-sectional areas of the sections having the diameters $D_1$ and $D_2$ respectively. It is to be emphasized that while circular cross-sectional structures are shown in the figures it is not essential to these designs that the structures have circular cross-sectional areas.

$k_p$ is fixed by the properties of the material, is constant for the particular piezoelectric material used and is equal to $$\frac{2\pi}{\lambda_p}$$

where $\lambda_p$ is the wave length of sound in the piezoelectric material at the frequency used.

$S_p$=the cross-sectional area of the piezoelectric material having the diameter $D_p$.

$\rho_p$=the density of the piezoelectric material.

$c_p$=the velocity of sound in the piezoelectric material.

$\rho_2$=the density of rods.

$c_2$=the velocity of sound in the rods.

$$k=\frac{2\pi}{\lambda}$$

$\lambda$ being the wave length of sound in the rods at the frequency used.

$$N=\frac{S_3}{S_2}$$

where $S_3$ and $S_2$ are the cross-sectional areas of the sections having the diameters $D_3$ and $D_2$ respectively.

A considerable reduction in the complexity of the remaining design equations that are required may be accomplished without a serious loss in accuracy by recognizing early in the derivations the fact that it will usually be desirable for the thickness $t$ of the piezoelectric disc to be small compared to the other dimensions of the sandwich structure, notably with respect to the dimensions $(b+a+q)$ and L, and also small with respect to $\lambda_p$, and that it will be desirable to minimize sound wave reflections from the boundaries of the piezoelectric disc and the rods.

U. S. Patent Number 2,550,771, dated May 1, 1951, to which reference is made, describes a specific case for construction of magnetostrictive transducers having a displacement node in a constricted section and an unsymmetrical arrangement of mass about this section and may be used, with such modifications as are pointed out hereinafter, for determining the basic physical configuration, dimensions and mass for a preferred embodiment of the piezoelectric sandwich transducers as described herein. I have discovered, however, that if equivalent quarter-wave solid sections formed of brass or the like are provided having sound transmitting properties substantially equal to that of one or more barium titanate discs or the like bonded in the constricted sections at and/or near the displacement node as shown and described herein, considerable reduction in the dimensions and mass of the transducer may be obtained over that for a magnetostrictive transducer having an identical resonant frequency and that this sandwich construction results in the combination of the best features and advantages of magnetostrictive transducers and piezoelectric transducers while not being subject to their undesirable limitations or disadvantages to any substantial degree.

Figure 5 shows an embodiment of my sandwich structure in which a piezoelectric disc 31 having a thickness $t$ is disposed between and bonded to a face portion 32 having a diameter $D_1$ integral with a constricted portion 33 having a diameter $D_2$ and a more massive rear portion 34 having a diameter $D_1$. The equivalent quarter-wave sections 35—36 have respectively the effective length $$\left(b+a+\frac{t}{2}\right)\text{ and }\left(L+\frac{t}{2}\right)$$

and the displacement node is located at the junction of the constricted section of the rear section, which is to say effectively in a transverse plane passing through the center of the piezoelectric disc 31.

Figure 6 shows a modification of the embodiment shown in Figure 5 wherein a piezoelectric disc 31 having a thickness $t$ is disposed between and bonded to front and rear equivalent quarter-wave sections 37—38 having respectively diameters $D_1$ and $D_3$ where $D_3$ is larger than $D_1$ although $D_3$ need not be greater than $D_1$ and may be equal to or smaller than $D_1$. For the embodiment shown in Figure 6 the displacement node is located in the constricted section 33 having the diameter $D_2$ and in a transverse plane passing through the center of the piezoelectric disc 31. As shown, the equivalent quarter-wave sections 37—38 have the length $(b+a)$ and $(q+L)$ and are designed according to the equation $$\cot k\left(q-\frac{t}{2}\right)\cot kL \neq n=\frac{S_3}{S_2}$$

and the expression for $\bar{M}$ must be changed slightly to account for the change in mass. In all of the structures shown herein the electrical field across the piezoelectric disc must be in the longitudinal or length direction and the transverse plane through the center of the piezoelectric disc is coincident with the displacement node of the vibrators or transducers for the single disc embodiment.

Figures 7 and 8 show two different ways of constructing a shaded piezoelectric transducer which heretofore has not been a practical possibility. As used herein the term "shaded piezoelectric transducer" means a piezoelectric transducer forming a permanent part of an array wherein it has one or more separable and distinct operating characteristics as may be required and is comparable in every respect to the function of a plurality of electrical windings on the leg or legs of a magnetostrictive transducer, each winding having a different number of turns. An intermediate material 39, preferably the same as the end portions 41—42, may be interposed between the two piezoelectric discs 43—44 (see Figure 7) if, for example, a single disc must be located a distance from the displacement node considerably greater than its thickness. Figure 8 illustrates a possible electrical connection 45 of a plurality of piezoelectric discs 46—47—48—49 in face to face relationship, which may include a piezoelectric element having the displacement node of the transducer substantially coincident with the center of said piezoelectric element, as well as other elements which are disposed a predetermined distance from the displacement node for performing functions similar to that of the piezoelectric discs 43—44 shown in Figure 7 or for more complicated functions or for amplitude shading. In every case a piezoelectric disc at the displacement node will provide a maximum signal and/or effect and a piezoelectric disc disposed a distance away from the displacement node will provide a lesser signal and/or effect dependent principally upon the distance it is located from the displacement node. It is to be further understood that, in accordance with the invention, substantial versatility in the location and/or electrical connection of the piezoelectric discs in the sandwich structure is obtainable as may be desired or necessary for different applications. By way of example and for purposes of illustration, a plurality of thin piezoelectric discs mounted in face-to-face relationship may be substituted for a single disc having the same total thickness and electrically connected in series and/or parallel relationship to obtain different electrical and acoustical effects. Similarly, a plurality of piezoelectric discs similar to those referred to immediately hereinabove may if desired, be mounted in face-to-face relationship wherein one or more discs are in electrical contact one with another but electrically isolated from one or more different discs. Still further, groups of such discs as referred to hereinabove may be located at and/or disposed away from the displacement node.

In view of the above it may now be evident that substantial versatility not heretofore possible is available to accommodate substantially any power handling requirements within the limits of piezoelectric materials, impedance requirements, shading requirements, multiple or consecutive operation of the transducer, or any combination thereof. The thickness of the piezoelectric discs, such as for example barium titanate, may vary from about .05 inch or less to about .25 inch, the optimum being about .10 inch. In view of the fact that the resonant frequency of such piezoelectric discs is of the order of 250 kc. when unloaded and about 7 kc. when loaded as part of a sandwich transducer, the effects of temperature on the resonant frequency is negligible.

Sound wave reflection at the boundaries of the piezoelectric disc or discs bonded to an end section may be maintained at a minimum value and maximum electrical conductivity and structural strength may be provided as shown in Figures 9 through 13 which show three alternate methods and structure for bonding a piezoelectric disc to an abutting transverse face of the end portions or the like. With reference now to Figures 9 and 10 each flat transverse face 51 in abutting relationship with a flat transverse face 52 of the piezoelectric disc 53 is provided with two coplanar semi-circular rings 54—55 having a radius of about three-fourths the radius of the piezoelectric disc 53 and spaced away from each other to form two oppositely disposed radial passages 56—57. Each ring 54—55 is provided respectively with a sharp edge 58—59 disposed away from the transverse surface 51 a distance of not more than about .002 inch. Each transverse surface 52 of the piezoelectric disc is provided with an electrically conductive coating 61 such as silver or the like and are bonded to the transverse surfaces 51 by a suitable cement or adhesive film 62 such as for example Araldite (Ciba) No. 101 and accelerator No. 951. When the rings 54—55 are brought into abutting relationship with the electrically conducting surfaces 61 of the piezoelectric disc 53, the sharp edges 58—59 of the rings are embedded in the conducting surfaces 61 thereby resulting in a permanent electrical connection and insuring the presence of an adhesive film 62 having a constant thickness. As pressure of, for example, about ten pounds is applied to the sandwich the passages or recesses 56—57 allow cement or an adhesive to flow into or away from the center portion 63 and prevents the existence of air pockets or variations in the density of the adhesive film 62 thereby resulting in a structure having maximum structural strength, minimum (and uniform) sound wave reflection at the boundaries of the piezoelectric discs and maximum electrical conductivity between the end sections 64—65 and the piezoelectric discs.

Figures 11 and 12 show an alternate constructure similar to that shown in Figures 9 and 10 to facilitate and insure proper alignment of the piezoelectric discs during assembly of the transducer. Semi-circular shoulders 66—67 integral with the end sections 64—65 and adapted for engagement with the outer radial edges 68—69 of the piezoelectric disc 71 extend outwardly past coplanar rings 54—55 identical to those described hereinabove. Recesses 72—73 are provided in radial alignment with the recesses 56—57 in the rings 54—55 and cooperate therewith to allow an adhesive 62 or the like to flow into or away from the space between the piezoelectric disc 71 and the transverse surfaces 51 as and for the purposes hereinbefore described.

With reference now to Figure 13, if it is desired to maintain a piezoelectric disc 53 in proper alignment and in electrical isolation from the end sections 64—65 or otherwise, the piezoelectric disc 53 may be provided with an axial passage 74 to receive a rod 75 of insulating material adapted to fit in axial recesses 76—77 in each end section 64—65. Insulating washers 78 of any suitable material having a thickness as specified hereinabove are disposed between the electrically conducting surfaces 61 of the piezoelectric disc 53 and the end sections 64—65 and electrical leads 79—81 may be connected in any suitable or convenient manner to the conducting surfaces 61 of the piezoelectric disc 53.

My invention has application to underwater sound equipment and particularly underwater sound equipment having a relatively low operating frequency of, for example, 10 kc. or less. My piezoelectric sandwich transducer may be used singly or in arrays as an alternate for magnetostrictive transducers or arrays. Moreover, arrays comprised of my piezoelectric sandwich transducer will have dimensions and a mass less than the corresponding size and mass of magnetostrictive arrays of like frequency and are particularly advantageous in this respect in addition to being easier and more economical to produce.

While the present invention has been described in its preferred embodiment, it is realized that modifications may be made, and it is desired that it be understood that no limitations on the invention are intended other than may be imposed by the scope of the appended claims.

Having now disclosed my invention, what I claim as new and desire to secure by Letters Patent of the United States is:

1. In a piezoelectric transducer the combination comprising: a first end portion and a second end portion; a constricted portion extending between and integrally joining said end portions and having a displacement node located therein; and a piezoelectric element forming an integral part of said constricted portion and having the same cross sectional size as said constricted portion.

2. In a piezoelectric transducer the combination comprising: an acoustically vibratory face portion and an opposite elongated end section; a constricted middle portion disposed between and rigidly united with said face portion and said end portion and having the center of mass located therein; and a piezoelectric element forming an integral part of said constricted middle portion and having the same cross section as said constricted middle portion, said piezoelectric element being disposed such that its center is substantially coincident with said center of mass.

3. The combination as described in claim 2 additionally including means to apply an electric field longitudinally of said piezoelectric element.

4. In a piezoelectric transducer the combination comprising: forward and rear equivalent quarter-wave sections each of which consists of a face portion and a constricted portion substantially perpendicular to the face portion; and a piezoelectric element integrally connecting the constricted portions whereby the center of the piezoelectric element is substantially coincident with the center of mass of the transducer and the cross section of the piezoelectric element and of the constricted portions are the same.

5. In a piezoeelectric transducer the combination comprising: forward and rear equivalent quarter-wave sections each of which consists of a face portion and a constricted portion substantially perpendicular to the face portion, the enlarged portion of the rear equivalent quarter-wave section having a mass greater than the mass of the enlarged portion of the forward quarter-wave section; and a piezoelectric element integrally connecting the constricted portions and having the same cross section as said constricted portions, said quarter-wave sections and said piezoelectric element being arranged and disposed such that the displacement node of the transducer is substantially coincident with the center of said piezoelectric element.

6. The combination as described in claim 5 wherein said forward and rear equivalent quarter-wave sections are solid and composed of an inert material having a sound transmitting ability approximately equal to the sound transmitting ability of the piezoelectric element.

7. The combination as described in claim 6 additionally including at least one piezoelectric element forming a part of said constricted portions and spaced away from said displacement node a predetermined distance.

8. The combination as described in claim 6 additionally including an electrically conducting coating on each transverse surface of said piezoelectric element; and first and second semicircular projection on each quarter-wave section surface adjacent each said piezoelectric transverse surface, each said first and second projection having an outwardly projecting substantially sharp edge, said first and second projections projecting outwardly about .002 inch and being spaced away from each other to form at least one recess.

9. A piezoelectric transducer comprising: forward and rear equivalent quarter-wave sections each of which consists of an inert solid face portion and an inert solid constricted portion substantially perpendicular to the face portion, each said constricted portion having at least one bonding surface substantially parallel to said face portion; at least one thin piezoelectric element having electrically conducting transversely disposed surfaces and forming an integral part of a constricted portion and having the same cross sectional size as said constricted portion, said equivalent quarter-wave sections and said piezoelectric elements having approximately equal sound transmitting characteristics; first and second semicircular projections on each said bonding surface having a sharp edge disposed outwardly about .002 inch, said first and second projections being spaced away from each other to form at least one inwardly extending recess whereby a bonding material for bonding a piezoelectric element to a bonding surface may be evenly and completely distributed therebetween, the length of said constricted portions and said piezoelectric elements being such that the displacement node of the transducer is located between the face portions, and each piezoelectric element is disposed a predetermined distance from said displacement node.

References Cited in the file of this patent

UNITED STATES PATENTS

| | | |
|---|---|---|
| 2,343,738 | Bechmann et al. | Mar. 7, 1944 |
| 2,474,241 | Garrision | June 28, 1949 |
| 2,571,019 | Danley | Oct. 9, 1951 |
| 2,596,460 | Arenberg | May 13, 1952 |